Aug. 8, 1967  E. A. ROESKE  3,334,496
HYDROSTATIC TRANSMISSION

Filed April 5, 1965  8 Sheets-Sheet 2

Inventor:
Eugene A. Roeske
By: H. J. Schmid
Atty.

Inventor:
Eugene A. Roeske
By: H. J. Schmid
Atty.

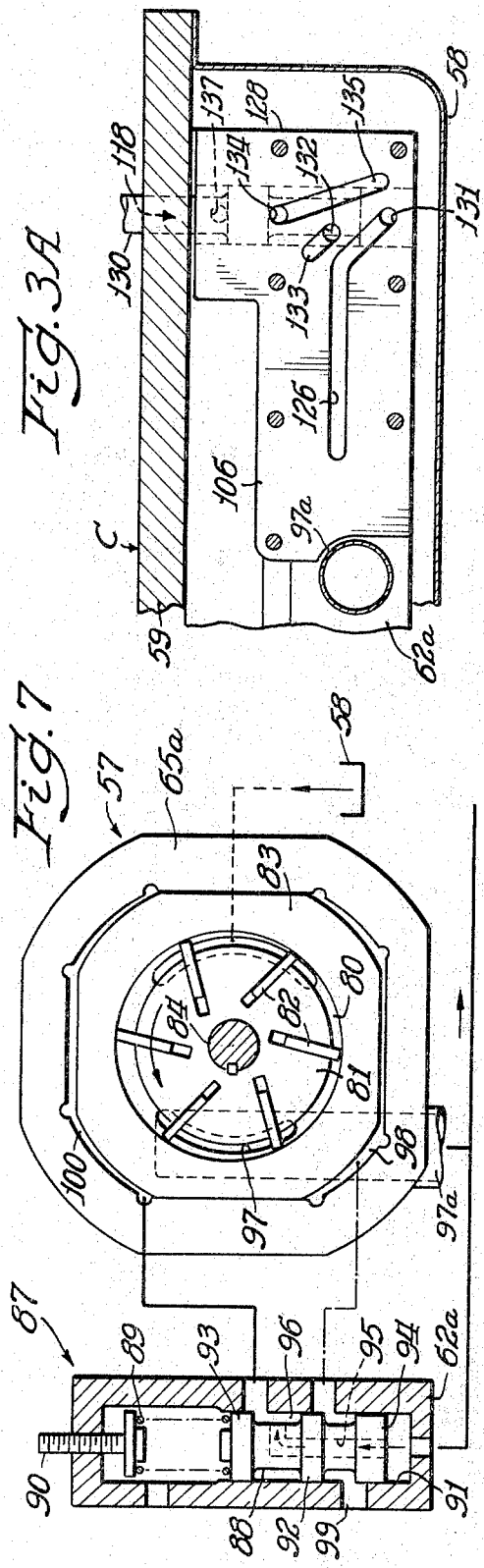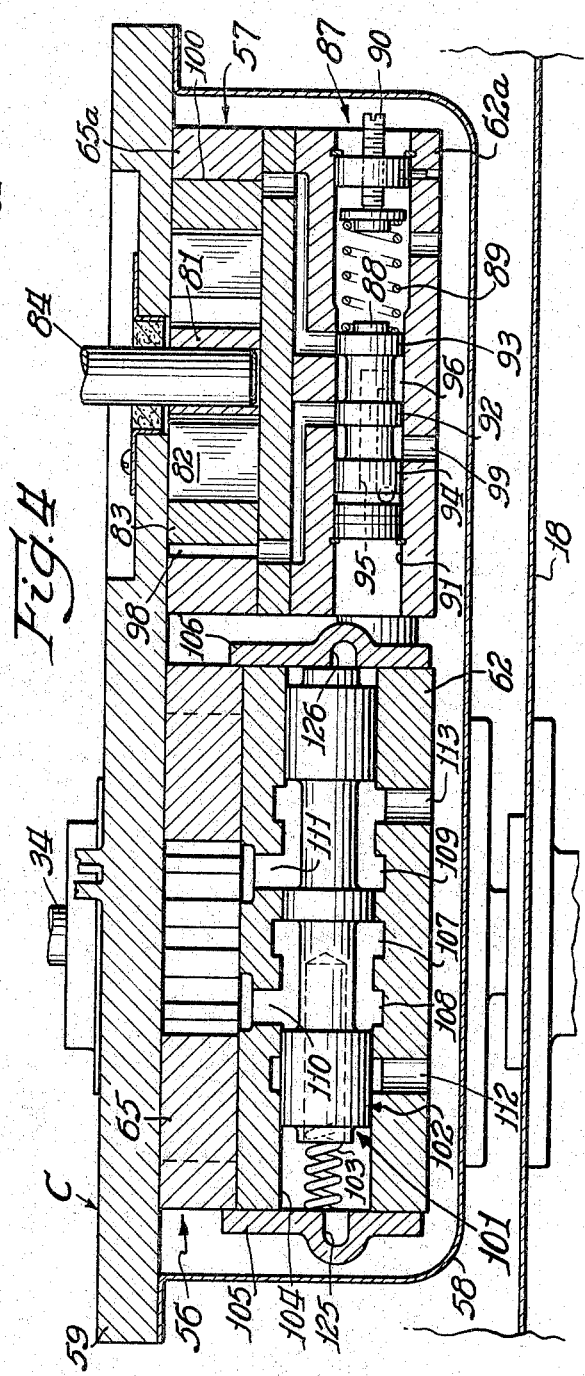

Aug. 8, 1967     E. A. ROESKE     3,334,496
HYDROSTATIC TRANSMISSION
Filed April 5, 1965     8 Sheets-Sheet 5
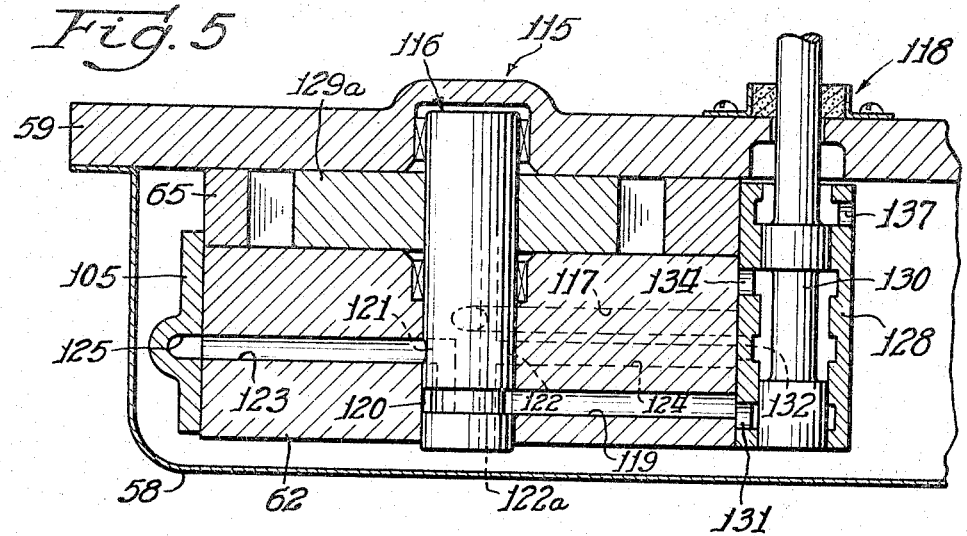
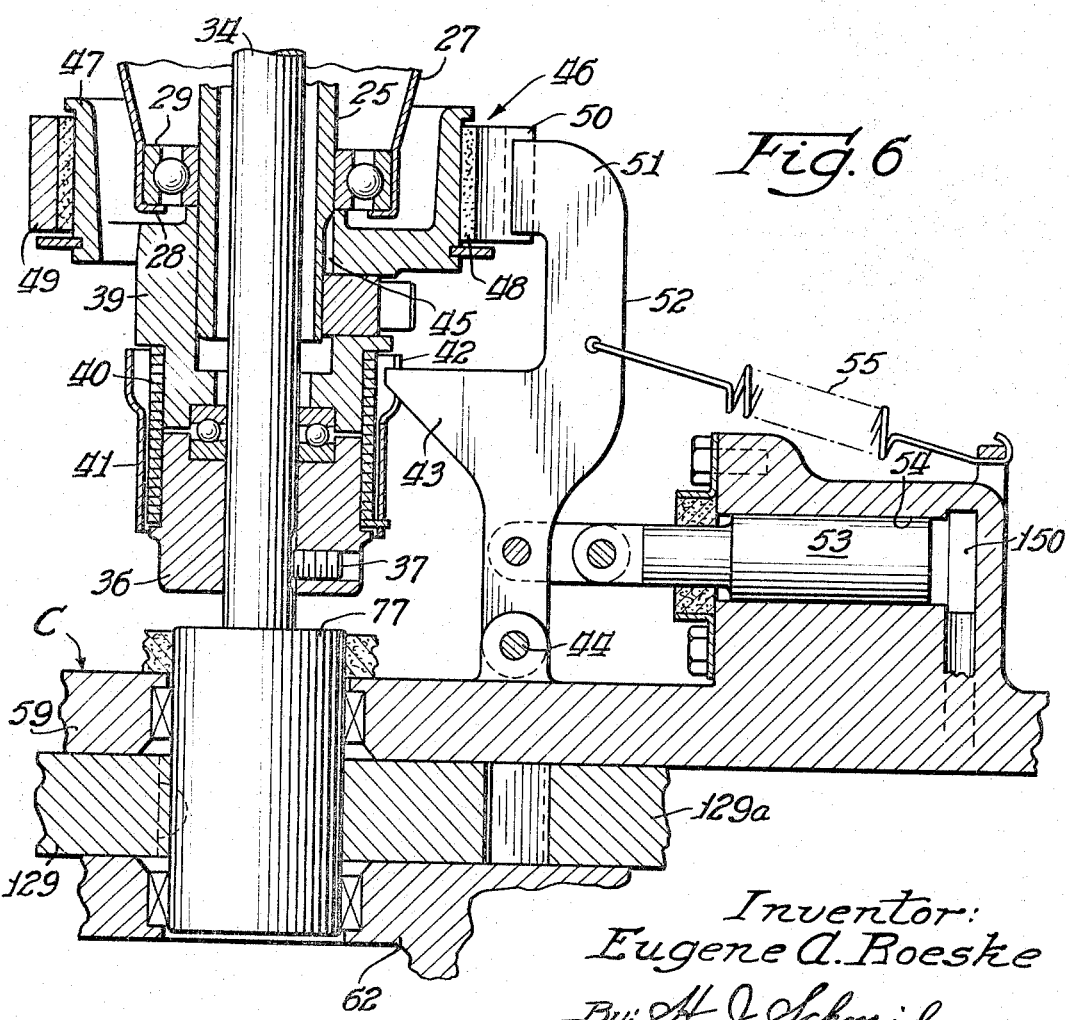
Inventor:
Eugene A. Roeske
By: H. J. Schmid
Atty.

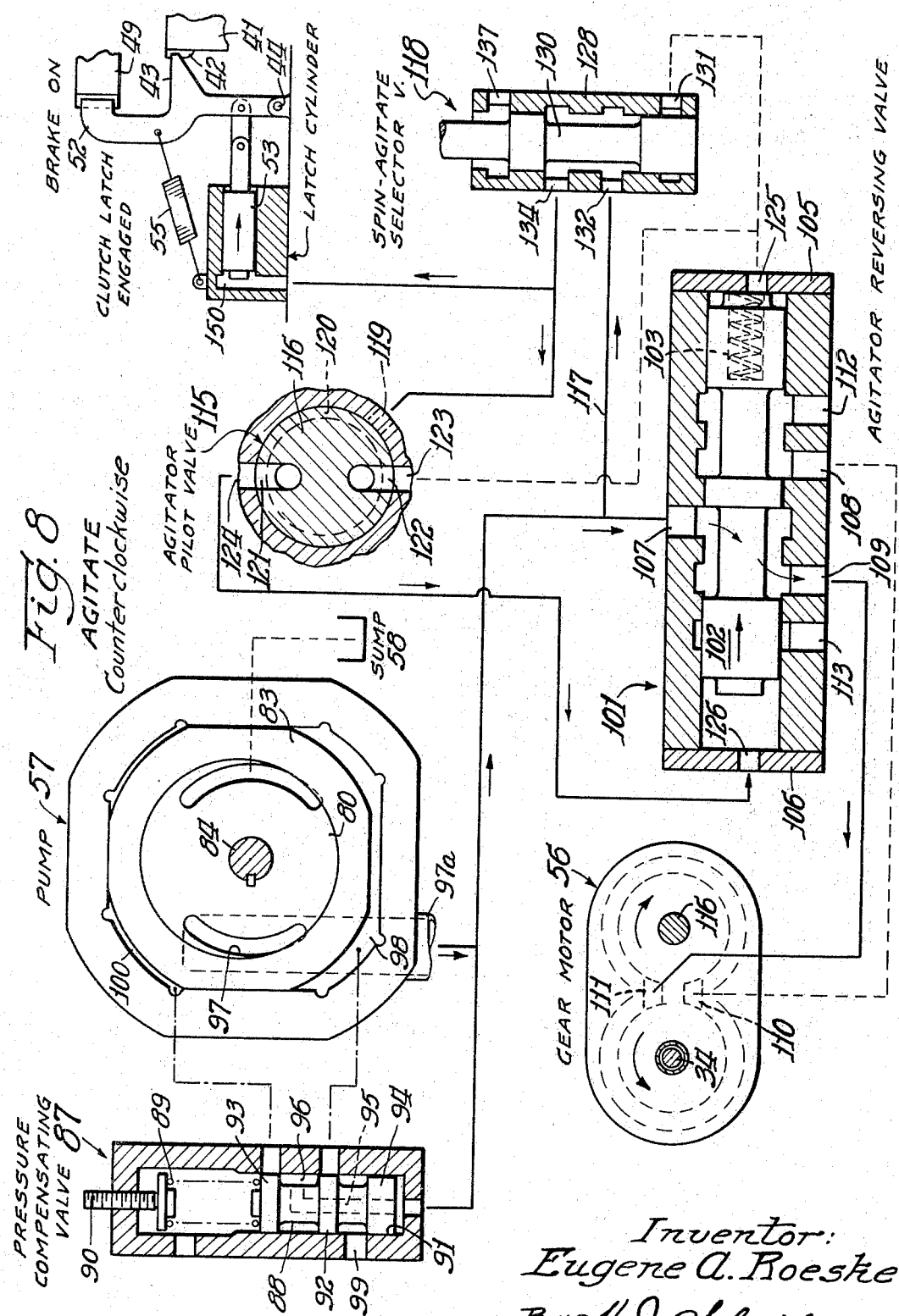

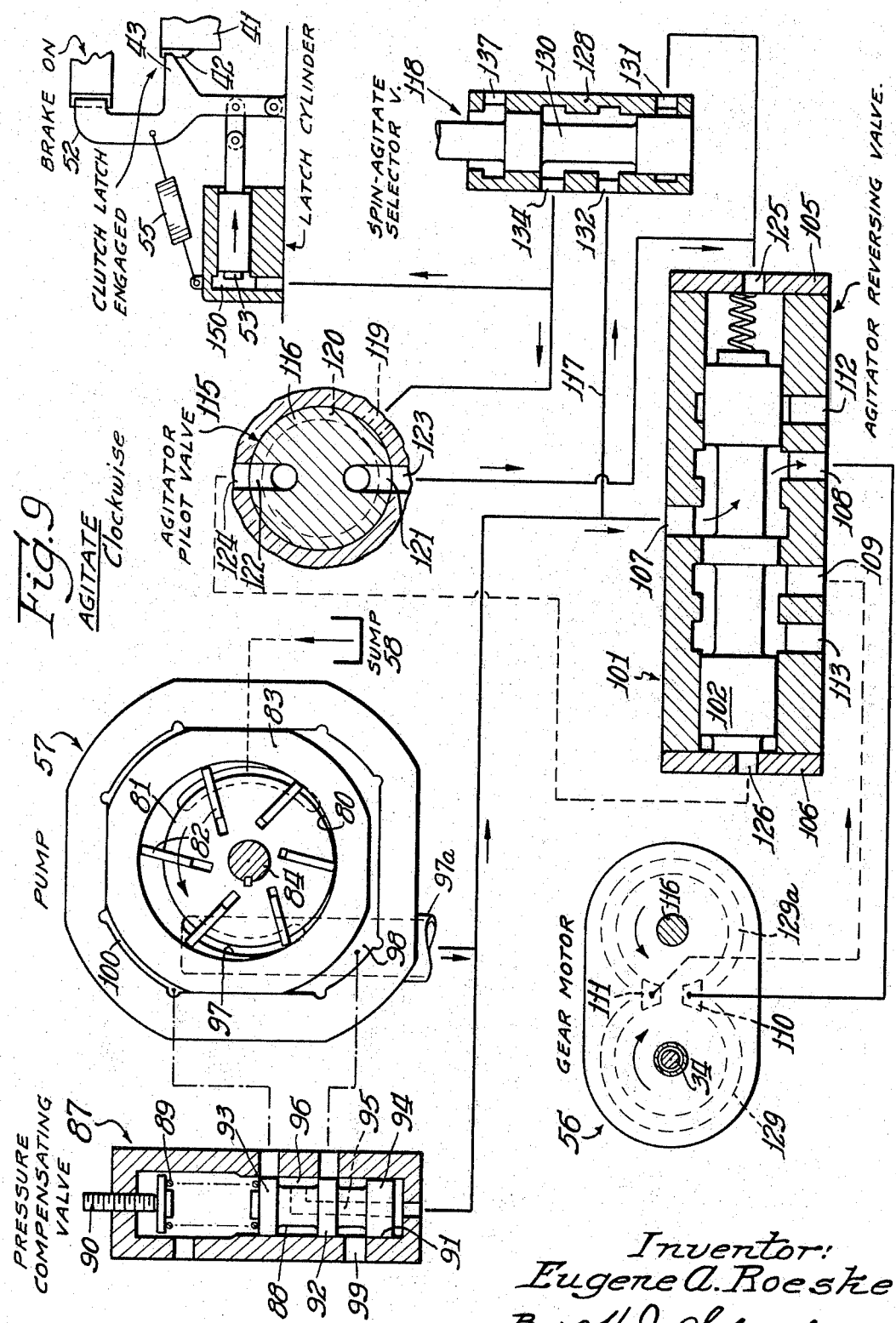

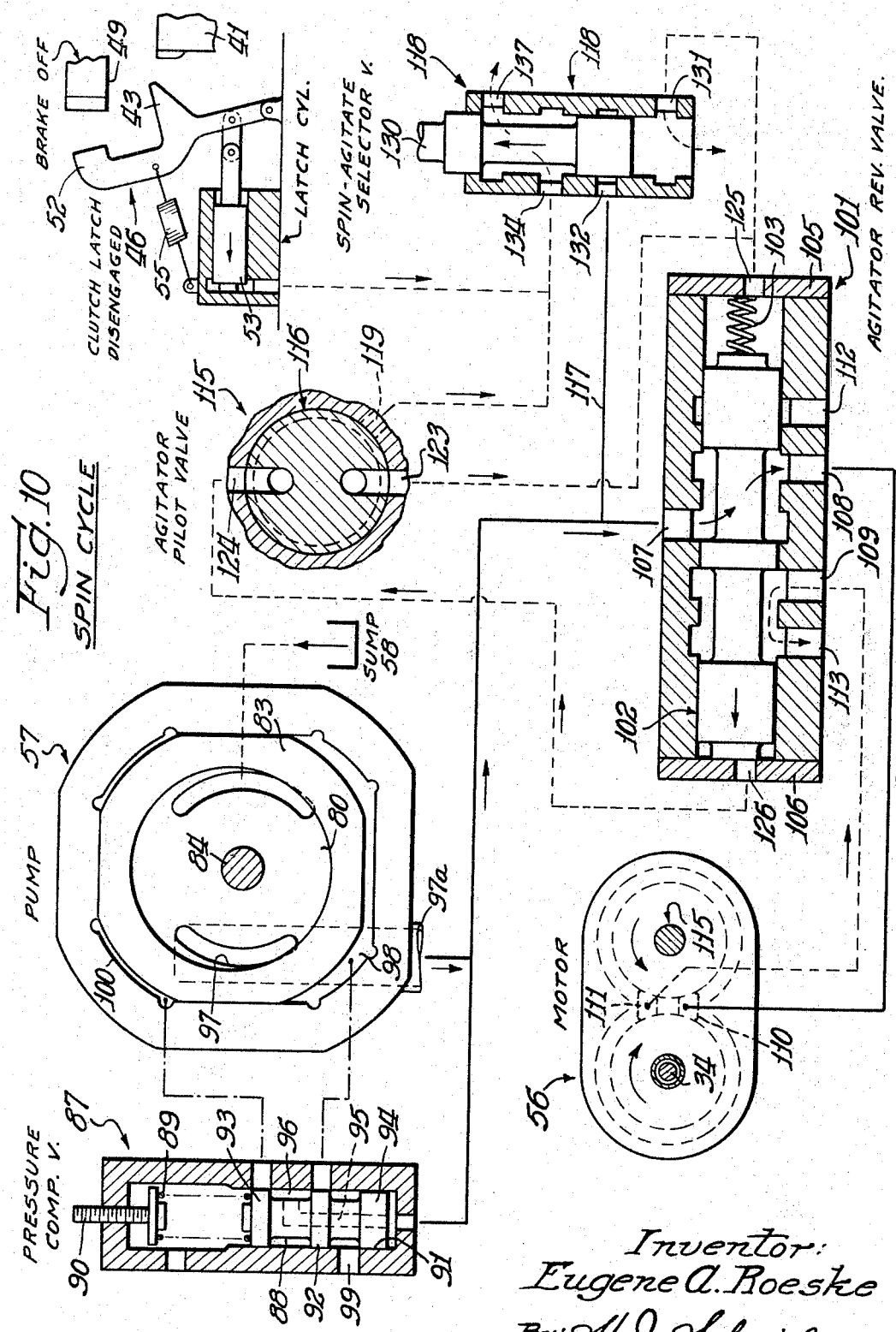

United States Patent Office 3,334,496
Patented Aug. 8, 1967

3,334,496
HYDROSTATIC TRANSMISSION
Eugene A. Roeske, St. Louis, Mo., assignor to Borg-Warner Corporation, Chicago, Ill., a corporation of Illinois
Filed Apr. 5, 1965, Ser. No. 445,674
18 Claims. (Cl. 68—23)

This invention relates to a hydraulic drive system for laundry machines.

An object of the invention is to provide an improved hydraulic drive system for oscillating an agitator of a laundry machine to wash clothes, and for rotating a clothes container of the machine to dry the clothes.

Another object of the invention is to provide an improved hydraulic drive system for a laundry machine of the type described in which the agitator action controls, and is controlled by, a novel valve arrangement.

Another object of the invention is to provide an improved hydraulic drive system for a laundry machine and including a single hydraulic motor means operative, by novel control valve means, to provide forward and reverse movement for oscillating an agitator and to effect uni-directional movement for rotating a clothes container.

A specific object of the invention is to provide an improved hydraulic drive system for a laundry machine and including an agitator-operated and -controlled pilot valve for directing the hydraulic fluid to a valve controlling bi-directional rotation of a fluid-operated gear motor connected to the agitator for periodic reversal of the agitator to provide oscillatory washing strokes of the agitator.

A further object of the invention is to provide an improved hydraulic drive system for a laundry machine having a clutch and brake mechanically controlling agitator and container operation and operable by fluid pressure-responsive devices including a valve arrangement-functioning to select agitator oscillation or container rotation.

The above, and other objects, features and advantages of the invention, will be apparent in the following detailed description of an illustrative embodiment thereof in connection with the accompanying drawings forming a part hereof, and wherein:

FIG. 3A is a horizontal sectional view taken on line 3A—3A of FIG. 2;

FIG. 4 is a vertical sectional view of the pump, motor, and control valving, said view being taken on line 4—4 of FIG. 2 as indicated by the arrows;

FIG. 5 is a vertical sectional view of the motor and control valve arrangement shown in FIGS. 2 and 3 taken on line 5—5 of FIG. 2 as indicated by the arrows;

FIG. 6 is a vertical sectional view of the brake and clutch mechanism shown in FIG. 3 and the hydraulic control therefor;

FIG. 7 is a horizontal schematic view of the pump, and pressure compensating valve therefor;

FIGS. 8, 9, and 10 are schematic views of the hydraulic drive system and controls therefor, FIGS. 8 and 9 illustrating the functioning of various components during oscillation movement of the agitator, and FIG. 10 during rotation of the clothes container.

Figure 1:
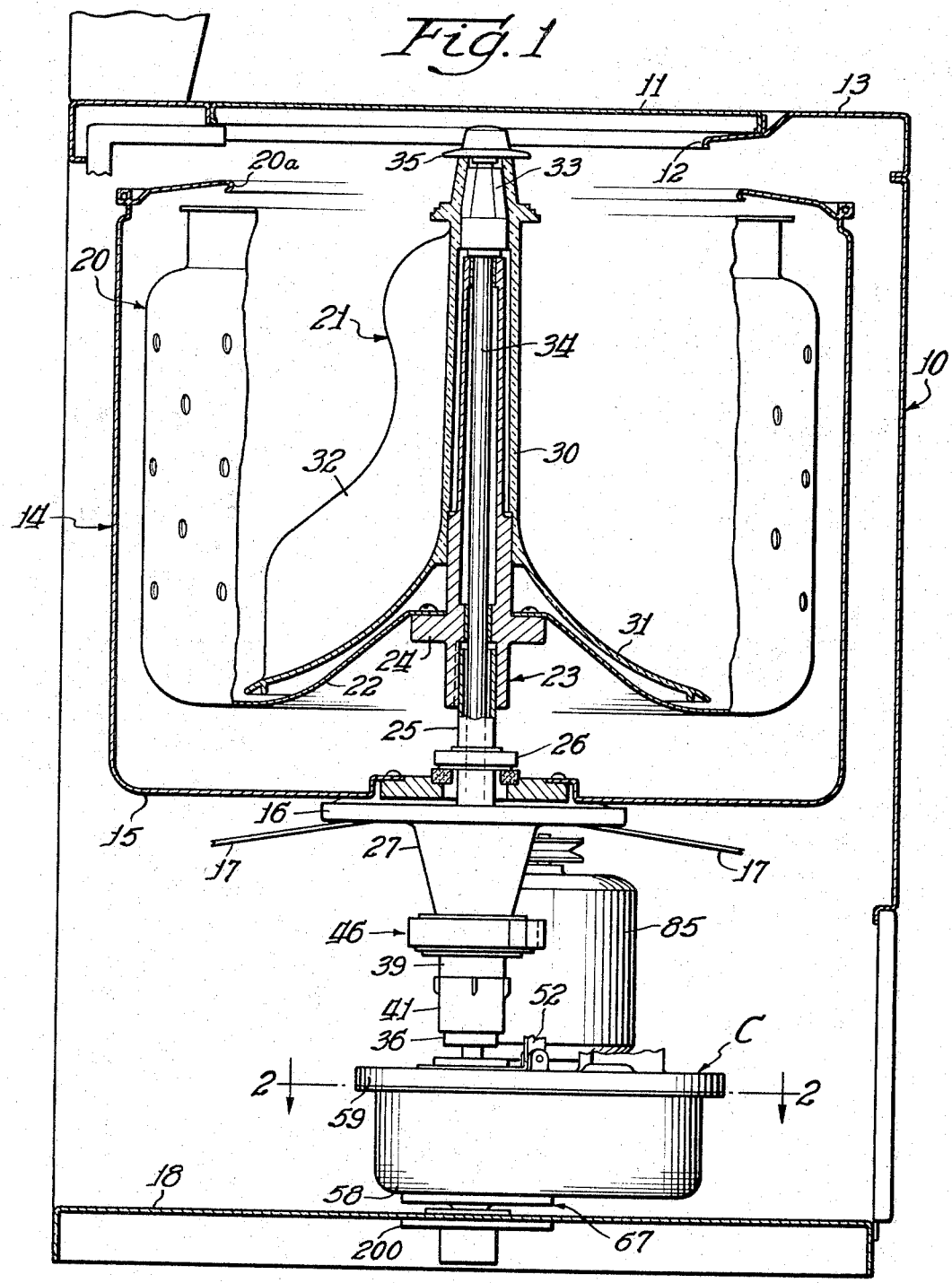
FIG. 1 is a vertical sectional view of a laundry machine embodying the improved hydraulic drive system.

Referring to the drawings in detail, and initially to FIG. 1 thereof, the washing machine, embodying my improved hydraulic drive system, comprises an outer cabinet 10 having a top door 11 received within and closing a clothes-loading and unloading opening 12 in the top wall 13 of the cabinet. A cylindrical tub 14 is disposed within the cabinet and has its bottom wall 15 provided with a central opening receiving an annular support member 16 connected to the adjacent peripheral edge of the wall 15 and extending beneath the tub for connection to flexible leaf springs 17 of a tub-centering and gyration-suppression assembly such as shown in U.S. Patent 2,807,950, issued Oct. 1, 1957. The tub is further supported on a base 18 at the bottom of the cabinet as will be later explained.

A perforate clothes container or basket 20 is disposed within the tub 14 and has a top opening 20a for receiving clothing to be cleaned by the action of an oscillatable agitator, generally indicated at 21, within the basket. The basket has a conical bottom wall 22 provided with a central opening for receiving a vertically disposed hollow standard 23 having a collar 24 for seating and supporting engagement with the tub bottom wall 22 connected thereto as shown. The lower portion of the standard 23 receives and has splined engagement with a sleeve 25 extending downwardly through a bearing assembly 26, mounted on support member 16, and into a housing 27 of inverted frusto-conical shape and forming a depending portion of the support member 16. As shown in FIG. 6, the housing 27 has its lower end formed with an internally directed flange 28 to provide a seat for the outer race of a bearing assembly 29. The inner race of the assembly 29 is secured to the sleeve 25 and the outer race is fixed to the housing 27 for rotational movement of the basket relative to the tub 14 as will be described.

Referring to FIG. 1, the agitator 21 comprises a centerpost 30 and a lower bell-shaped portion 31, the centerpost and lower portion having integrally formed vanes 32. The agitator is supported for oscillatory movement relative to the standard 23 and, for this purpose, the hollow upper portion of the agitator is formed with an upwardly tapering inner hexagonal bore complementary to and engaging a hexagonal member 33 connected to a drive shaft 34 to permit unitary rotation of the agitator and drive shaft. The agitator is removably supported on the member 33 by a cap nut 35 in threaded engagement with a stud on the member 33. The shaft 34 extends through the standard 23 and sleeve 25 and is connected to the hydraulic drive system.

It will be seen, from FIG. 6, a drive hub 36 is fixed to the shaft 34 by a screw 37 threaded into the hub and received within a slot in the shaft. A hub 39 is keyed as at 45 to the sleeve shaft 25 connected to the basket. A bearing assembly is provided between the hubs 36 and 39 to permit relative rotation thereof. A one-way clutch spring 40 surrounds the hubs 36 and 39 and is controllable to tighten and grip the hubs 36 and 39 upon rotation of the hub 36 in one direction and to loosen its grip to disconnect drive upon rotation of the hub 36 in the opposite direction. To selectively control this function of the clutch spring, a shield 41 surrounds the spring and has an opening in its lower portion to receive and hold the bottom end of the spring. The upper end of the shield is formed to provide a plurality of ears 42. A clutch pawl 43 is pivotally connected at its lower end by a pin 44 to a casing C housing the hydraulic drive system.

The purpose of the described clutch mechanism is to control drive from the shaft 34 to the basket to effect rotation thereof for drying the cloths. During enegagement of the clutch pawl 43 with the shield 41, the clutch spring 40 is prevented from gripping the hub 39 and is thereby ineffective to transmit drive from the drive hub 36 to the driven hub 39 so that the drive shaft is effective only to oscillate the agitator. However, upon release of the engagement of pawl 43 with shield 41 and rotation of hub 36 in a direction to effect gripping engagement of the clutch spring 40 with the driven hub 39, the basket will be rotated.

As described, the shaft 34 is connected to the hydraulic drive system to periodically reverse the direction of rotation of the agitator during a washing operation. During this operation, it is undesirable to have the basket freely moving. However, it has been found the washer operation is smoothed and the strain on the hydraulic drive motor is reduced by permitting slight movement of the basket at the point where the agitator reverses direction during oscillation. Also, following high speed rotation of the basket during the drying operation, it is desirable to slow down the basket. For these purposes, a brake assembly 46 is provided including an annular brake member or drum 47 forming a portion of the hub 39. The brake member 47 is surrounded by a brake lining 48 tightly held against the hub by a brake band 49 of spring steel to retard basket rotation. To control operation of the brake assembly, the band 49 has an end tang 50 engageable and disengageable by a brake latch 51. The brake latch 51 is normally operative to engage the brake band tang 50 to retard or restrain rotation of the basket during the washing operation. It may be noted that the illustrated structure is effective to cause engagement of the latch 51 with the band tang 50 during rotation of the brake band 49, in either the forward or reverse directions. Free rotation of the brake member 49, and thereby the basket, is permitted by movement of the latch to disengage the latch and the brake band.

As disclosed, the brake latch 51 and clutch pawl 43 are combined in a single control member 52 having its lower end pivotally supported at 44 on the hydraulic drive housing C. This control member is operated to the position shown in FIGS. 3 and 6 by a hydraulic actuating device in the form of a piston 53 within a cylindrical recess 54 formed in the housing C, the piston having one end connected by linkage to the control member 52 so that fluid under pressure in the cylinder is operative to move and maintain the piston 53, and thereby the member 52, in the positions shown where in the clutch pawl 43 engages the shield 41 and the brake latch 51 engages the brake band tang 50 to prevent basket rotation. Upon release of the fluid under pressure, a spring 55, fixed at one end to the housing and at its other end to the control member 52, is operative to move the control member 52 to disengage latch 51 from the brake band 49 and also to disconnect the clutch pawl 43 from the shield 41 so that the braking action on the hub 39 is released and the clutch spring 40 is operative to couple the drive shaft 34 and basket 20.

The improved hydraulic drive system is of the hydrostatic type comprising, in general: a hydraulically-operated gear motor 56 drivingly connected to the drive shaft 34 for oscillating the agitator during the clothes-washing operation or for rotating the clothes container or basket at high speed during the clothes-drying operation, as prescribed by the previously described hydraulically-operated clutch and brake; an electrically-operated pump 57 for supplying fluid under pressure to the gear motor 56; and a control valving arrangement for diverting the fluid under pressure to an agitator control valve associated with the drive shaft 34, and to the hydraulically-operated clutch and brake control member 52. These hydraulic drive and control components are positioned within the casing C to provide a very compact unit as shown in FIG. 1.

Figure 2:
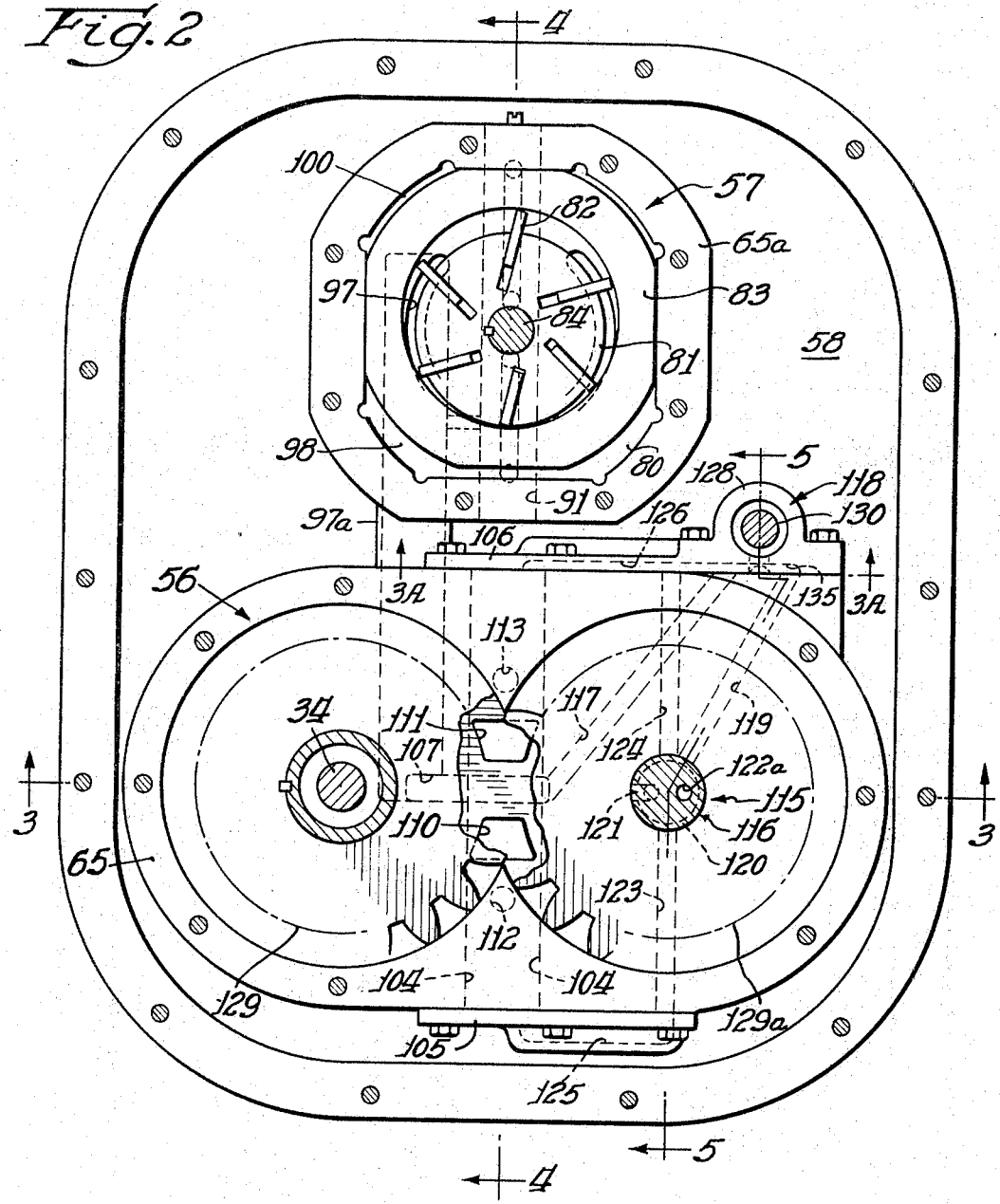
FIG. 2 is a horizontal sectional view of the hydraulic drive system illustrating the hydraulic pump and gear motor thereof and corresponding to the line 2—2 of FIG. 1 looking in the direction of the arrows.
Figure 3:
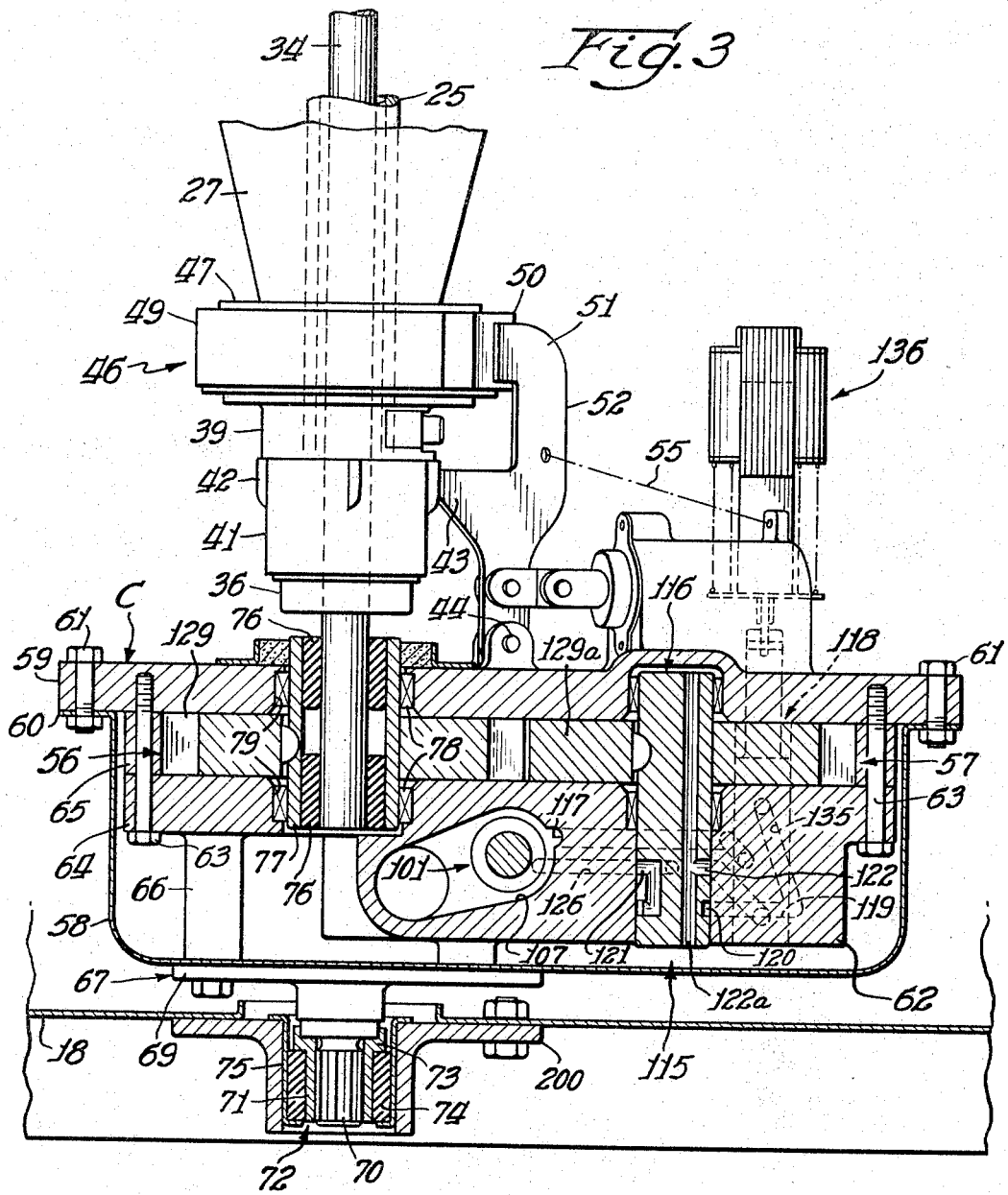
FIG. 3 is a vertical sectional view of the hydraulic drive system taken on line 3—3 of FIG. 2 as indicated by the arrows and also illustrating a clutch and brake respectively controlling agitator-oscillation and container-rotation.

Prior to the description of the specific hydraulic drive components and control valve arrangement, attention is directed to the casing C and its function of supporting and mounting the basket and agitator, their described mechanical drive elements, as well as the hydraulic drive system and electric motor, in a manner permitting slight gyratory movements during operation of the laundry machine. More particularly, the casing C comprises a rectangular steel housing or pan 58, as shown in FIGS. 2 and 3, having its flanged upper opening closed by a cover plate 59 of substantial thickness and fastened to the flange 60 by bolt and nut assemblies 61. The plate 59 forms one common side wall of the vane pump and gear motor working chambers, the opposite side of these chambers being provided by a block 62 connected to the plate 59 by bolts 63 extending through reduced portions 64 of the block, and also a plate 65, the plate having openings containing the gear pump and motor, and the block 62 and plate 65 housing the valving arrangement. Referring to FIG. 3, depending from and forming a portion of the block 62 is a stud 66 seated on the bottom wall of the casing 58 and secured thereto, and a support member 67 by bolts, as shown. The support member 67 comprises a round plate 69 with a depending stub shaft 70 in splined engagement with a sleeve 71 of a mounting assembly 72, the sleeve having its upper flanged end 73 engaging a shoulder on the stub shaft 70. The mounting assembly 72 further comprises a rubber bushing 74 on the sleeve 71 and a spacer collar 75. The collar 75 has its lower flanged end engaging and supporting the bushing, and its upper flanged end overlying the top surface of the plate 200 fixed to the bottom casing wall 18. Thus, the pan 58, and hydraulic power and control equipment, are supported on the plate 67 mounted on the bottom wall 18 of the cabinet 10.

The plate 59 and block 62 are provided with aligned openings receiving the lower end of the drive shaft 34 and rubber bushings 76, the bushings being compressed between the shaft and a sleeve 77 with the sleeve 77 engaging spaced roller bearings 78 confined between the sleeve and raceways 79 formed in the plate 59 and block 62 and supporting the drive shaft as shown.

It will be evident from the above description that the basket, agitator, and their drive mechanism, as well as the hydraulic motor and pump, and control valving, are supported on the stub shaft 70 of the mounting member 67, in a manner to permit rotation of the drive shaft on a vertical axis, while allowing limited lateral or transverse gyratory movement of these components about the vertical axis as controlled by the gyration suppression assembly 17.

Referring now to the hydraulic drive components and control valving therefor, the pump 57 is of the variable volume vane type. More particularly, as shown in FIGS. 2, 4, and 5, the pump comprises the spaced members 59 and 62a, defining, with an opening in the intermediate plate 65a, a chamber 80 receiving a rotor 81, provided with machined slots and containing slidable vanes 82 impinging against a cam ring 83 under the influence of centrifugal force when the motor is driven by the drive shaft 84 of an electric motor 85 (FIG. 1). The cam ring is normally eccentric to the rotor and slidable in the spacer plate 65a, in a manner to vary the eccentricity. Variation of the cam ring eccentricity changes the stroke of the vanes and the volume of oil pumped.

Referring to FIGS. 4 and 7, the pump volume is controlled by a pressure compensating control arrangement 87 consisting of a spool 88, spring 89, and adjusting screw 90 located in a cylindrical bore 91 in the valve block 62a. The spool is provided with a middle land 92 and end lands 93 and 94 and has a central passage 95 with one end thereof terminating in an annular recess 96 between the lands 92 and 93. The pressure compensating control operates in a manner such that the pressure of the fluid acting on the head area of the land 94 of the spool times the head area always equal the preset force of the spring 89. The head area of the land 94 of the spool 88 is connected to the pump discharge port 97 so that their pressures are equal. If an increase in transmission load should tend to increase the pressure, the force of the pressure acting on the head area of land 94 of the spool would exceed the force of spring 89 causing the spool to move right in FIG. 4. The movement would cause the stroke increasing side 98 (FIGS. 2 and 7) of slidable cam ring 83 to be connected to drain through opening 99 (FIG. 4) and the stroke decreasing side 100 of the cam ring to be connected to pressure through opening 95. This disparity of pressures on the cam ring causes it to move in a stroke decreasing direction thereby decreasing pump flow until the forces on the spool again become balanced causing the spool to assume a position which causes a balance of forces on the cam ring. This balance of forces occurs at a pressure preset by the adjusting screw 90. Conversely, if a decrease in transmission load should tend to decrease pressure, the forces on the spool become unbalanced in such a manner that the spool moves left (FIG. 4), causing the ports to be opened in such a manner that the stroke increasing side 98 of the cam ring 83 is under higher pressure than the stroke decreasing side 100 causing the cam ring to move in a stroke increasing direction to increase the flow and pressure until the pressure again reaches the value preset by the adjusting screw.

The pump inlets directly from the pan 58 through an inlet port in the form of a transfer tube 97a and discharges through discharge port 97 through cored passages in the valve block 62 and the transfer tube to the agitator-reversing valve generally indicated at 101.

Referring to FIG. 4, the agitator-reversing valve 101 consists of a spool 102 and spring 103 located in a cylindrical bore 104 in the block member 62 for the pump, the bore being closed at opposite ends by caps 105 and 106. The agitator-reversing valve has a high pressure port 107 (FIG. 8) connecting to the pump discharge port 97; outlet ports 108 and 109 connecting to the ports 110 and 111 of the hydraulic motor 56 respectively; and drain ports 112 and 113 draining directly to the pan 58. With the agitator reversing valve in the position shown in FIGS. 4 and 9, the pump discharge fluid flows through ports 97, 107, and 108 to the motor port 110; and the fluid is ported through motor port 111, and valve ports 109 and 113 to the pan causing a clockwise rotation of the output shaft 34 of the gear motor 56, as viewed in FIG. 9. Moving the agitator reversing valve spool 102 from the position shown in FIGS. 4 and 9 to the extreme right position shown in FIG. 8 will cause the pump discharge port 97 to connect to high pressure port 107, port 109, and to motor port 111, and motor port 110 to connect through valve ports 108 and 112 to drain causing a counterclockwise rotation of the motor output shaft 34.

The agitator-reversing valve spool 102 is shifted back and forth for effecting reversal of the motor shaft 34 and the agitator 21; and this movement is accomplished under the control of the agitator pilot valve assembly 115 (FIGS. 3, 5, and 9). The agitator pilot valve assembly consists of a rotatable valve spool 116 housed, with the agitator reversing valve 101, in the valve block 62 and in plate 59. Fluid under high pressure flows from the reversing valve high pressure port 107 through a drilled passage 117 (FIGS. 2 and 3), a spin-wash selector valve assembly 118, drilled passage 119, to an annular groove 120 (FIGS. 3 and 5) and drilled passages in the pilot valve spool, to the high pressure pilot valve passage 121. Directly opposite the high pressure pilot valve passage 121 is the pilot valve drain passage 122 connected to the pan. In the valve block 62 are passages 123 and 124 (FIG. 2) connected to the reversing valve by grooves 125 and 126, respectively, in the reversing valve end caps 105 and 106 and the body 128 of the spin-agitate selector valve 118.

As the hydraulic pressure built up by the pump 57 causes the drive gear 129 of motor 56, the output shaft 34, and the idler gear 129a to rotate, the agitator pilot spool 116 will rotate counterclockwise (FIG. 2). The reversing valve spool 102 is held to the right (FIG. 8) until the pilot valve spool 116 rotates (FIG. 9) so that its passages 121 and 122 register with the reversing valve passages 123 and 124, respectively, pressurizing passages 123 and 125 and draining passages 124 and 126 causing the reversing valve spool to move to the left (FIG. 9) and thereby reversing the motor idler gear 129a to a counterclockwise direction, and the motor output shaft 34 to a clockwise direction. The motor output shaft 34 will continue to rotate clockwise until the pilot holes 121 and 122 line up with 124 and 123, respectively, again causing the reversing valve spool to shift and the motor to reverse. This oscillation or agitation will continue until interrupted by action of the spin-agitate selector valve 118.

The spin-agitate selector valve 118 (FIGS. 3 and 5) is contained, with the agitator reversing valve assembly, within the block 62 and comprises a spool 130. The selector valve body 128 contains a port 131 connected by groove 126 (FIG. 3A) to both the reversing valve pilot passage 124 (FIGS. 2 and 9) and one end of the reversing valve spool 102, a passage 132 (FIG. 3A) being connected by a groove 133 and passage 117 to the high pressure port 107 of the agitator reversing valve; a passage 134 connected by groove 135 to passage 119 which connects to annular groove 120 of the agitator pilot valve spool providing the high pressure fluid for the pilot valve. A solenoid 136 (FIG. 3) is operative to actuate the spin-agitate selector valve spool 130, and is deenergized when in the downward position shown in FIGS. 3 and 5. Passages 132 and 134 communicate with each other to provide a connection from port 107 through passages 117, 133, 132, 134, 135, 119, to 120 providing high pressure to the pilot valve 115 which can function as described. When solenoid 136 is energized, it pulls the spin-agitate valve spool 130 to the upward position (FIG. 10). As a result, passage 132 is closed to shut off the high pressure fluid to the agitator pilot valve, and passage 134 is connected to the passage 137 causing any pressure in the agitator pilot valve to drain through ports 137 and 131. Thus, with the pressure fluid supply to the agitator pilot valve cut off and drained, the agitator pilot valve is prevented from effecting reversing action of the agitator; and as the ends of the agitator reversing valve assembly are drained, the spring 103 will return the reversing valve spool 102 to the position shown in FIG. 10 to direct fluid to the gear motor 56 for spinning the basket 20 as the brake and clutch latch 46 are moved to the position of FIG. 10.

More particularly, the combined brake and clutch latch 50 is hydraulically operated by piston 53 and is shown in FIGS. 3 and 6 as an example of what accessory functions can be performed with the fluid under pressure generated in the hydraulic drive system. The head end area 150 of the cylinder is connected to passage 119 by conduit means (FIG. 9). When the spin-agitate selector valve spool 130 is in its down "agitate" position, passage 119 conducts fluid under pressure to the agitator pilot valve spool 116 and also to the head end area 150 of the cylinder causing the piston 53 to move to engage the brake and disengage the clutch, as previously described, for oscillation of the agitator. When the spin-agitate selector valve spool 130 is in the up or "spin" position, the passage 119 and also the cylinder are drained; and spring 55 releases the latch to engage the clutch and disengage the brake, as previously described, to obtain rotation of the basket to dry the clothes.

The operation of the improved hydraulic drive system and controls therefor, with particular reference to its embodiment in an automatic washer, can best be understood by consideration of FIGS. 8, 9, and 10. FIGS. 8 and 9 illustrate the relative positions of the hydraulic drive and control components during the washing cycle of the automatic washer and FIG. 10 discloses the components' positions during the spin or water-extraction cycle of the washer.

Referring to FIGS. 8 and 9, FIG. 8 shows the disposition of the control valving to provide counterclockwise rotation of the agitator; and FIG. 9 indicates the control valving providing for clockwise rotation of the agitator, during the washing operation. It may be observed the clutch is disengaged and the brake applied because the selector valve 118 has its spool 130 positioned to direct fluid under pressure to the piston 53 to engage the brake latch 52 with the brake band 49 and to engage the clutch pawl 43 with a tang 42 on the clutch sleeve 41.

In FIG. 8, and assuming the electric motor 85 is energized and the selector valve 118 is moved to the position shown, the pump 57 is operative to provide fluid under pressure to its port 97 connected to the port 107 of the agitator reversing valve assembly 101 and to the port 132 of the selector valve assembly 118. At this time, the reversing valve spool 102 directs the fluid to the port 109 and to the port 111 of the hydraulic motor 56 so that the motor is energized for rotation of its gears in the directions indicated by the arrows, the fluid then flowing through ports 110 and 108 to drain passage 112 in the valve assembly 101. Concurrently, fluid under pressure is also directed through port 132 of the selector valve assembly 118 to its port 134 and to the annular groove 120 in the pilot valve spool 116, passages 121 and 124, and to port 126 of the end cap 106 of the valve spool assembly 101 so that the spool 102 has been moved to the right against the action of spring 103. As the gears of the hydraulic motor 56 are rotated, the agitator 21 will rotate in a counterclockwise direction and pilot valve spool 116 will be rotated in a clockwise direction.

Referring to FIG. 9, rotation of the agitator and thereby the pilot valve spool 116 of FIG. 8 will cause the spool 116 to rotate to the position shown in FIG. 9 causing fluid under pressure to be directed by the spool 116 to the opening in the end cap 105 of the reversing valve assembly 101 to move the spool 102 to the position shown in FIG. 9. As a result, fluid under pressure from the pump enters port 107 of the valve 101 and is directed by the spool 102 to the port 108 and thence to the port 110 of the motor 56 causing the motor to rotate its gears in the direction of the arrows to impart rotary clockwise movement to the agitator and a counterclockwise motion to the pilot valve spool 116.

It will be evident that, upon energization of the electric motor, and movement of the solenoid-operated selector valve spool 130 to the position shown in FIGS. 8 and 9, the control valve arrangement will automatically function to provide oscillatory movement of the agitator and as controlled by the agitator's rotational action imparted to the agitator pilot valve spool 116.

Referring now to FIG. 10 illustrating the hydraulic drive arrangement and its controls to obtain rotational spinning movement of the basket 20, the selector valve spool 130 has been moved upwardly to prevent fluid under pressure from passing through the valve assembly 118 to the agitator pilot valve assembly and also to the piston 53 of the combined brake and clutch device 46. As a result, the brake latch 52 and clutch pawl 43 are moved by the spring 55 to the position shown, wherein the brake latch 52 is disengaged from the brake band 49 to render the brake ineffective, and also the clutch pawl 43 is released from the clutch shield 41 to permit the one-way clutch to become effective to couple the drive shaft 34 to the basket. The hydraulic motor 56 receives fluid under pressure from pump 57, by way of port 97 of the pump, ports 107 and 108 of the valve assembly 101 and port 110 of the motor 56, causing the gear motor 56 to rotate the basket at high speed to centrifugally extract the water from the fabrics in the basket. It will be noted fluid under pressure is cut off from the valve 115 so that the agitator reversing valve spool 102 is moved to the left by the spring 103 and will remain in this position due to the fluid under pressure being prevented from entering the ports 125 and 126 in the end caps 105 and 106 of the valve assembly.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What is claimed is:

1. In a hydraulic transmission for a clothes cleaning machine having a rotatable clothes container, an oscillatable agitator in said container, and drive means connected to said agitator, the combination therewith of hydraulically-controllable coupling means between and engageable to connect said container and said drive means for rotating said container; a single positive displacement, reversible hydraulic motor connected to said drive means for oscillating the agitator and operable, upon engagement of said coupling means, to rotate the container; first conduit means connected to said motor and forming a first circuit through which hydraulic fluid can circulate to and from said motor in opposite directions for effecting forward and reverse rotation of said motor; a first valve in said first circuit and movable in opposite directions to control the directions of flow of hydraulic fluid to said hydraulic motor; second conduit means connected to said first conduit means and forming a second circuit for hydraulic fluid to move said first valve to different positions for selectively determining the direction of flow of hydraulic fluid through said first circuit; spring means operative to move said first valve to direct fluid in said first circuit to said motor for rotation thereof in one direction, during the absence of fluid in said second conduit means; a second valve rotatable by said hydraulic motor and controlling flow of hydraulic fluid through said second circuit to said first valve to move said first valve successively to said different positions for alternately directing fluid to said motor for forward and reverse rotation of said motor and thereby said agitator; control mechanism for said coupling means; a spring biasing said control mechanism to effect engagement of said coupling means; fluid-responsive means operative to actuate said control mechanism to effect disengagement of said coupling means against the action of said spring; third conduit means connected to said second conduit means and to said fluid-responsive means and forming a third circuit for hydraulic fluid for operating said fluid-responsive means; a third valve controlling the flow of fluid in said second and third circuits and operable to interrupt the flow of hydraulic fluid to said second valve and to said fluid-responsive means to thereby cause operation of said spring to actuate said control mechanism to effect engagement of said coupling means to connect said drive means and said container and to effect positioning of said first valve by the spring means thereof to direct fluid to said motor to provide operation of said motor in said one direction to rotate said container; and a pump operative to deliver hydraulic fluid under pressure to said circuits.

2. In a hydraulic transmission for a clothes cleaning machine having a rotatable clothes container, an oscillatable agitator in said container, and drive means connected to said agitator, the combination therewith of hydraulically-controllable coupling means between and engageable to connect said container and said drive means for rotating said container; a single positive displacement, reversible hydraulic motor connected to said drive means for oscillating the agitator and operable, upon engagement of said coupling means, to rotate the container; first conduit means connected to said motor and forming a first circuit through which hydraulic fluid can circulate to and from said motor in opposite directions for effecting forward and reverse rotation of said motor; a first valve in said first circuit and movable in opposite directions to control the directions of flow of hydraulic fluid to said hydraulic motor; second conduit means connected to said first conduit means and forming a second circuit for hydraulic fluid to move said first valve to different positions for selectively determining the direction of flow of hydraulic fluid through said first circuit; spring means operative to move said first valve to direct fluid in said first circuit to said motor for rotation thereof in one direction, during the absence of fluid in said second conduit means; a second valve rotatable by said hydraulic motor and controlling flow of hydraulic fluid through said second circuit to said first valve to move said first valve successively to said different positions for alternately directing fluid to said motor for forward and reverse rotation of said motor and thereby said agitator; fluid-responsive means controlling operation of said coupling means; third conduit means connected to said second conduit means and to said fluid-responsive means and forming a third circuit for hydraulic fluid for operating said fluid responsive means; a third valve controlling the flow of fluid in said second and third circuits and operable to interrupt the flow of fluid to said second valve and to control the flow of fluid to said fluid-responsive means to operate said fluid-responsive means to effect engagement of said coupling means to connect said drive means and said container and to effect positioning of said first valve by the spring means thereof to direct fluid to said motor to provide operation of said motor in said one direction to rotate said container; and a pump operative to deliver hydraulic fluid under pressure to said circuits.

3. In a hydraulic transmission for a clothes cleaning machine having a rotatable clothes container, an oscillatable agitator in said container, and drive means connected to said agitator; the combination therewith of hydraulically-controllable clutch means between and engageable to connect said container and said drive means for rotating said container; hydraulically-controllable brake means for said container and operable to restrain rotation of said container; a single positive displacement, reversible hydraulic motor connected to said drive means; first conduit means connected to said motor and forming a first circuit through which hydraulic fluid can circulate to and from said motor in opposite directions for effecting forward and reverse rotation of said motor; a first valve in said first circuit and movable in opposite directions to control the directions of flow of hydraulic fluid to said hydraulic motor; second conduit means connected to said first conduit means and forming a second circuit for hydraulic fluid to move said first valve to different positions for selectively determining the direction of flow of hydraulic fluid through said first circuit; spring means operative to move said first valve to direct fluid in said first circuit to said motor for rotation thereof in one direction, during the absence of fluid in said second conduit means; a second valve rotatable by said hydraulic motor and controlling flow of hydraulic fluid through said second circuit to said first valve to move said first valve successively to said different positions for alternately directing fluid to said motor for forward and reverse rotation of said motor and thereby said agitator; control mechanism for said clutch means and said brake means and including a spring biasing said control mechanism to effect engagement of said clutch and to release said brake means, and fluid-responsive means operative to actuate said control mechanism to effect disengagement of said clutch means and to engage said brake means against the action of said spring; third conduit means connected to said second conduit means and to said fluid-responsive means and forming a third circuit for hydraulic fluid for operating said fluid responsive means; a third valve controlling the flow of fluid in said second and third circuits and operable to interrupt the flow of hydraulic fluid to said second valve and to said fluid-responsive means to thereby cause operation of said spring and thereby said control mechanism to effect engagement of said clutch means to connect said drive means and said container, to release said brake means, and to effect positioning of said first valve by the spring means thereof to direct fluid to said motor to provide operation of said motor in said one direction to rotate said container; and a pump operative to deliver hydraulic fluid under pressure to said circuits.

4. In a hydraulic transmission for a clothes cleaning machine having a rotatable clothes container, an oscillatable agitator in said container; drive means connected to said agitator; a positive displacement, reversible hydraulic motor connected to said drive means; first conduit means connected to said motor and forming a first circuit through which hydraulic fluid can circulate to and from said motor in opposite directions for effecting forward and reverse rotation of said motor; the combination therewith of a first valve in said first circuit and movable in opposite directions to control the directions of flow of hydraulic fluid to said hydraulic motor; second conduit means connected to said first conduit means and forming a second circuit for hydraulic fluid to move said first valve to different positions for selectively determining the direction of flow of hydraulic fluid through said first circuit; a second valve rotatable by said hydraulic motor and controlling flow of hydraulic fluid through said second circuit to said first valve to move said first valve successively to said different positions for alternately directing fluid to said motor for forward and reverse rotation of said motor and thereby said agitator; and a pump operative to deliver hydraulic fluid under pressure to said circuits.

5. In a hydraulic transmission for a clothes cleaning machine having a rotatable clothes container, an agitator in said container, and drive means connected to said agitator, the combination therewith of hydraulically-controllable coupling means between and engageable to connect said container and said drive means for rotating said container; control mechanism for said coupling means; a single positive displacement hydraulic motor connected to said drive means for oscillating the agitator and operable, upon engagement of said coupling means, to rotate the container; first conduit means connected to said motor and forming a first circuit for hydraulic fluid for energizing said motor; a first valve in said first circuit and movable to different positions respectively providing for the flow of hydraulic fluid to said hydraulic motor to actuate said agitator or to rotate said container; a spring biasing said control mechanism to effect engagement of said coupling means; fluid-responsive means operative to actuate said control mechanism to effect disengagement of said coupling means against the action of said spring; second conduit means connected to said first conduit means and to said fluid-responsive means and forming a second circuit for hydraulic fluid for operating said fluid responsive means; a second valve controlling flow of fluid in said second circuit and operable to interrupt the flow of hydraulic fluid to said fluid-responsive means to thereby cause operation of said spring to engage said coupling means to connect said drive means and said container; and a pump operative to deliver hydraulic fluid under pressure to said circuits.

6. In a hydraulic transmission for a clothes cleaning machine having a rotatable clothes container, an oscillatable agitator in said container, and drive means connected to said agitator, the combination therewith of hydraulically-controllable coupling means between and engageable to connect said container and said drive means for rotating said container; a single positive displacement hydraulic motor connected to said drive means for oscillating the agitator and operable, upon engagement of said coupling means, to rotate the container; first conduit means connected to said motor and forming a first circuit through which hydraulic fluid can circulate to and from said motor for effecting forward and reverse rotation of agitator by said motor; a first valve in said first circuit and movable to control the flow of hydraulic fluid to said hydraulic motor; second conduit means connected to said first conduit means and forming a second circuit for hydraulic fluid to move said first valve to different positions for selective flow of hydraulic fluid through said first circuit; spring means operative to move said first valve to direct fluid in said first circuit to said motor for rotation thereof during the absence of fluid in said second conduit means; a second valve rotatable by said hydraulic motor and controlling flow of hydraulic fluid through said second circuit to said first valve to move said first valve successively to said different positions for alternately directing fluid to said motor for forward and reverse rotation of said agitator by said motor; fluid-responsive means for controlling operation of said coupling means; third conduit means connected to said second conduit means and to said fluid-responsive means and forming a third circuit for hydraulic fluid for operating said fluid responsive means; a third valve controlling flow of fluid in said second and third circuits and operable to interrupt the flow of hydraulic fluid to said second valve and to said fluid-responsive means to thereby cause operation of said spring to engage said coupling means to connect said drive means and said container and to effect positioning of said first valve by the spring means thereof to direct fluid to said motor to provide operation of said motor to rotate said container; and a pump operative to deliver hydraulic fluid under pressure to said circuits.

7. In a hydraulic transmission for a clothes cleaning machine having a rotatable clothes container, an oscillatable agitator in said container; drive means connected to said agitator; a positive displacement hydraulic motor connected to said drive means; first conduit means connected to said motor and forming a first circuit through which hydraulic fluid can circulate to and from said motor for effecting forward and reverse rotation of said agitator by said motor; the combination therewith of a first valve in said first circuit and movable to control flow of hydraulic fluid to said hydraulic motor; second conduit means connected to said first conduit means and forming a second circuit for hydraulic fluid to move said first valve to different positions for selective flow of hydraulic fluid through said first circuit; spring means operative to move said first valve to direct fluid in said first circuit to said motor for rotation thereof during the absence of fluid in said second conduit means; and a second valve rotatable by said hydraulic motor and controlling flow of hydraulic fluid through said second circuit of said first valve to move said first valve for directing fluid to said motor for forward and reverse rotation of said agitator by said motor; and a pump operative to deliver hydraulic fluid under pressure to said first and second conduit means.

8. In a hydraulic transmission for a clothes cleaning machine having a rotatable clothes container, an oscillatable agitator in said container, drive means connected to said agitator; a single positive displacement hydraulic motor connected to said drive means; first conduit means connected to said motor and forming a first circuit means through which hydraulic fluid can circulate to and from said motor for effecting forward and reverse rotation of said agitator by said motor to oscillate said agitator; the combination therewith of first valve means in said first circuit means and movable to control flow of hydraulic fluid to said hydraulic motor; second conduit means connected to said first conduit means and forming a second circuit means for hydraulic fluid to move said first valve means to different positions for selective flow of hydraulic fluid through said first circuit means; means controlling flow of hydraulic fluid to move said first valve means to direct fluid in said first circuit means to said motor for rotation thereof and thereby said container during the absence of fluid in said second conduit means; second valve means operated by said hydraulic motor and controlling flow of hydraulic fluid through said second circuit means to said first valve means to move said first valve means for directing fluid to said motor for forward and reverse rotation of said agitator by said motor; and a pump operative to deliver hydraulic fluid under pressure to said circuit means.

9. In a hydraulic transmission for a clothes cleaning machine having a container; an oscillatable agitator; in said container; drive means connected to said agitator; positive displacement hydraulic motor means connected to said drive means; first conduit means connected to said motor means and forming a first circuit means through which hydraulic fluid can circulate to and from said motor means for effecting forward and reverse rotation of said agitator by said motor means; the combination therewith of first valve means in said first circuit means and movable to control flow of hydraulic fluid to said hydraulic motor means; second conduit means connected to said first conduit means and forming second circuit means for hydraulic fluid to move said first valve means to different positions for selective flow of hydraulic fluid through said first circuit means; a second valve means operated by said hydraulic motor means and controlling flow of hydraulic fluid through said second circuit means to said first valve means to move said first valve means to its said different positions for directing fluid to said motor means for forward and reverse rotation of said agitator by said motor means; and a pump operative to deliver hydraulic fluid under pressure to said circuit means.

10. In a hydraulic transmission for a clothes cleaning machine having a rotatable clothes container, an oscillatable agitator in said container, first drive means for said agitator, and second drive means for said container; hydraulic motor means for oscillating said first drive means and rotating said second drive means; a pump for providing hydraulic fluid under pressure; valve means between said pump and said hydraulic motor means and controlling the flow of hydraulic fluid to effect operation of said hydraulic motor means to oscillate said first drive means, said valve means being actuatable by operation of said hydraulic motor means to control the flow of fluid to move said hydraulic motor means in opposite directions to oscillate said agitator; the combination therewith of a fluid-controlled brake for preventing rotation of said container, and control means operative to prevent flow of hydraulic fluid to said valve means and to direct the hydraulic fluid to release said brake and to energize said hydraulic motor means for rotating said second drive means.

11. In a hydraulic transmission for a clothes cleaning machine as defined in claim 10 wherein said brake is responsive to fluid under pressure, and said control means is a valve operative to release the fluid under pressure on said brake and to direct fluid under pressure to energize said hydraulic motor means to rotate said second drive means.

12. In a hydraulic transmission for a clothes cleaning machine as defined in claim 10 wherein a fluid-controlled one-way clutch is provided to couple said second drive means to said hydraulic motor means.

13. In a hydraulic transmission for a clothes cleaning machine as defined in claim 10 wherein said first drive means is directly connected to said hydraulic motor means, and said second drive means is connectible to said container by a one-way clutch, and fluid-operable means controls said clutch.

14. In a hydraulic transmission for a cltohes cleaning machine having a rotatable clothes container, an agitator in said container, first drive means for said agitator, second drive means for said container, hydraulic motor means for said first and second drive means; the combination therewith of clutch means operable to connect one of said drive means to said hydraulic motor means; first hydraulic control means for said clutch means; first valve means operative to control flow of fluid to said hydraulic control means and thereby engagement and release of said clutch means; second valve means movable by operation of said agitator to direct hydraulic fluid to operate said hydraulic motor means in opposite directions to actuate said first drive means to oscillate said agitator; and third valve means controlling flow of hydraulic fluid to said first and second valve means.

15. In a hydraulic transmission for a clothes cleaning machine having a rotatable clothes container; an oscillatable agitator in said container; first drive means for said agitator; second drive means for said container; hydraulic motor means for said first and second drive means; first valve means controlling flow of hydraulic fluid to said hydraulic motor means for selectively controlling operation of said motor means for oscillation of said agitator or rotation of said container, said first valve means including valving operative by said agitator to control the flow of fluid to said hydraulic motor means to actuate said hydraulic motor means to oscillate said agitator; the combination therewith of clutch means for connecting one of said drive means to said hydraulic motor means; first fluid-operable control means for said clutch means; brake means for preventing rotation of said container; second fluid-operable control means for energizing said brake means; and second valve means controlling operation of said first and second control means and operable to release fluid under pressure to said first and second fluid-operable control means during positioning of said first valve means to direct fluid to said hydraulic motor means to oscillate said agitator.

16. In a hydraulic transmission for a clothes cleaning machine having a clothes container; an agitator in said container; the combination therewith of an hydraulic motor for oscillating said agitator and rotating said container; a positive displacement pump for providing hydraulic fluid under pressure to said hydraulic motor; first valve means between said pump and said motor and in a fluid circuit through which fluid can circulate to and from said motor in opposite directions for effecting forward and reverse rotation of said motor to oscillate said agitator; second valve means mechanically movable by said agitator during oscillation thereof to direct hydraulic fluid alternately to opposite ends of said first valve means to move said first valve means in opposite directions for circulation of fluid to and from said motor; and third valve means controlling flow of hydraulic fluid to said second valve means and having a first position for directing fluid under pressure to said second valve means and having a second position preventing flow of fluid under pressure to said second valve means while said first valve means is positioned to direct fluid to said hydraulic motor to effect operation thereof to rotate said container.

17. In a hydraulic transmission for a clothes cleaning machine as defined in claim 16 wherein said first valve means is movable by spring means to position said first valve means to direct fluid to said hydraulic motor to effect operation thereof to rotate said container when said third valve means is in its second position.

18. In a hydraulic transmission for a clothes cleaning machine having a rotatable container, and an oscillatable agitator in said container; first drive means for said agitator; second drive means for said container; hydraulic motor means for said first drive means; valve means controlling the flow of hydraulic fluid to said hydraulic motor means, and including a valve actuatable by said hydraulic motor means, to cause fluid to flow in opposite directions to said hydraulic motor means to oscillate said agitator; the combination therewith of means for preventing rotation of said container by said second drive means during operation of said hydraulic motor means and including brake means, and fluid-operated control means for rendering said brake means effective; a clutch operable in response to the flow of fluid to said hydraulic motor means to connect said first drive means to said hydraulic motor means; and valving for controlling flow of fluid to said valve means, and thereby said hydraulic motor means, and to engage said clutch to establish drive of said first drive means by said hydraulic motor means and also to said fluid-operated means to engage said brake means to prevent rotation of said container.

References Cited
UNITED STATES PATENTS

| | | | |
|---|---|---|---|
| 3,242,703 | 3/1966 | Brundage | 68—23 |
| 3,248,913 | 5/1966 | Brundage | 68—133 |

WILLIAM I. PRICE, *Primary Examiner.*